(12) United States Patent
Kawauchi et al.

(10) Patent No.: US 9,187,126 B2
(45) Date of Patent: Nov. 17, 2015

(54) LOCK DEVICE

(71) Applicant: HONDA MOTOR CO., LTD., Tokyo (JP)

(72) Inventors: Ryo Kawauchi, Wako (JP); Kazuki Tomioka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/479,487

(22) Filed: Sep. 8, 2014

(65) Prior Publication Data

US 2015/0069730 A1 Mar. 12, 2015

(30) Foreign Application Priority Data

Sep. 10, 2013 (JP) ................................. 2013-187199

(51) Int. Cl.
*B62D 17/00* (2006.01)
*B62D 7/14* (2006.01)
*B60G 7/00* (2006.01)

(52) U.S. Cl.
CPC ................ *B62D 17/00* (2013.01); *B60G 7/006* (2013.01); *B62D 7/146* (2013.01); *B62D 7/148* (2013.01); *B60G 2200/44* (2013.01); *B60G 2200/462* (2013.01); *B60G 2206/1114* (2013.01)

(58) Field of Classification Search
CPC ........ B62D 17/00; B62D 7/148; B62D 7/146; B60G 7/006; B60G 2206/1114; B60G 2200/44; B60G 2200/462
See application file for complete search history.

(56) References Cited

U.S. PATENT DOCUMENTS

| 5,975,541 | A * | 11/1999 | Harara et al. ............... 280/5.524 |
| 7,029,014 | B2 * | 4/2006 | Hamm ........................ 280/5.502 |
| 7,210,693 | B2 * | 5/2007 | Ingalls et ................. 280/86.756 |
| 7,347,427 | B2 * | 3/2008 | Heinen ....................... 280/5.514 |
| 7,819,041 | B2 * | 10/2010 | Yamamori et al. .............. 74/640 |
| 2007/0006620 | A1 * | 1/2007 | Fukushima ..................... 70/186 |
| 2007/0080513 | A1 * | 4/2007 | Osterlanger et al. ...... 280/86.751 |
| 2012/0319374 | A1 * | 12/2012 | Watanabe .................... 280/91.1 |

FOREIGN PATENT DOCUMENTS

| JP | 2009-173192 A | | 8/2009 |
| JP | 2010254073 A | * | 11/2010 |
| JP | 2013001311 A | * | 1/2013 |

* cited by examiner

*Primary Examiner* — Ruth Ilan
*Assistant Examiner* — Darlene P Condra
(74) *Attorney, Agent, or Firm* — Westerman, Hattori, Daniels & Adrian, LLP

(57) ABSTRACT

A lock device includes a receiver having an outer peripheral surface that is attached to a side surface of a gear (rotating body) and rotates together with the gear (rotating body) and a solenoid pin whose tip is able to be in pressure contact with the outer peripheral surface of the receiver upon reception of the solenoid pin on the outer peripheral surface. The outer peripheral surface of the receiver includes a groove (recess) wider than the tip of the solenoid pin and projections projecting from the groove (recess). The solenoid pin has a tapered face at the tip. The height of the tapered face is at least at a level at which the tapered face is in contact with a corner of the projection with the tip being in contact with the groove (recess).

10 Claims, 5 Drawing Sheets and thereby, degrade control

LOCK DEVICE

CROSS REFERENCES TO RELATED APPLICATIONS

The present application claims priority under 35 U.S.C. §119 to Japanese Patent Application No. 2013-187199, filed Sep. 10, 2013, entitled "Lock Device." The contents of this application are incorporated herein by reference in their entirety.

TECHNICAL FIELD

The present application relates to a lock device that is provided in an actuator designed to expand and contract in order to adjust wheel alignment of rear wheels of a vehicle, and that inhibits expansion and contraction of the actuator.

BACKGROUND

The actuator expands and contracts by using a motor and a feed screw mechanism. A proposal has been made to provide a lock device for preventing inverse transfer of a driving force along a power transmission path connecting the motor and the feed screw mechanism together (see, for example, Japanese Unexamined Patent Application Publication No. 2009-173192).

FIG. 5 schematically illustrates a typical lock mechanism of a pin-insertion type using a solenoid. As illustrated in FIG. 5, a shift lock mechanism 100 using a solenoid is typically used in such a manner that a solenoid pin 101 is inserted in a groove 103 of a rotating body 102 so as to control the position of a counter part of the solenoid. In the case of using the shift lock mechanism 100 as a mechanism for locking the rotating body 102 such as a gear (not shown) of an actuator, a stroke of the actuator can be controlled by inserting the solenoid pin 101 into the groove 103 of the rotating body 102.

On the other hand, another type of such lock mechanism is a friction brake type mechanism in which an end surface of a pin is pressed against a rotating body to generate a frictional force so that the stroke can be controlled by using the frictional force. FIG. 6 schematically illustrates a typical lock mechanism of the friction brake type. As illustrated in FIG. 6, in a lock mechanism 110 of the friction brake type, a pin end surface 111a of a pin 111 is pressed against a rotating subject 112 with an appropriate spring force to generate a frictional force so that the stroke can be controlled by using the frictional force.

SUMMARY

In the technique of Japanese Unexamined Patent Application Publication No. 2009-173192, the solenoid and the rotating body do not slip, and thus, the steering position of rear wheels of a vehicle can be held without fail. Similarly, in the shift lock mechanism 100 illustrated in FIG. 5, the solenoid pin 101 is inserted into the groove 103 of the rotating body 102 so as to control the position of a counter part of the solenoid. However, if a functional loss or a wire breakage, for example, occurs in the solenoid during rotation of the rotating body 102, the solenoid pin 101 will directly receive an inertial force of the rotating body 102. In view of this, the solenoid pin 101 needs to be strong enough to withstand the inertial force. Obtaining such a high strength for the pin leads to an increase in cost and a decrease in design flexibility.

On the other hand, in the lock mechanism 110 of the friction brake type illustrated in FIG. 6, even with occurrence of, for example, a loss or a wire breakage during rotation as described above, an impact on the pin is smaller. The lock mechanism 110 of the friction brake type, however, has a much lower force for controlling rotation than the shift lock mechanism 100 of the pin-insertion type. Thus, for a rotating subject that is not locked with a frictional force, the shift lock mechanism 100 of the pin-insertion type needs to be used, and a large pin diameter is also needed in order to obtain a sufficient strength.

The present application describes a lock device that is not likely to break upon application of a small impact in reducing rotation of a rotating body and has a high holding power of a steering position of rear wheels.

In an aspect of the present application, a lock device is configured to be mounted on an actuator that expands and contracts by using a motor and a feed screw mechanism so as to adjust wheel alignment of rear wheels of a vehicle, and is configured to reduce rotation of a rotating body that rotates together with rotation of the motor. The lock device includes: a receiver that has an outer peripheral surface located at a side surface of the rotating body and configured to rotate together with rotation of the rotating body; and a solenoid pin whose tip is able to be in pressure contact with the outer peripheral surface of the receiver, the solenoid pin being configured to be received at the outer peripheral surface of the receiver, wherein the outer peripheral surface of the receiver has a recess wider than the tip of the solenoid pin and a projection projecting from the recess, the solenoid pin has a tapered face at the tip, and the tapered face has a height at least of a level at which the tapered face is in contact with a corner of the projection with a tip of the tapered face being in contact with the recess.

In this configuration, the receiver has a recess wider than the tip of the solenoid pin, and the tapered face of the solenoid pin has a height at least of a level at which the tapered face is in contact with the corner of the projection with the tip of the tapered face being in contact with the recess. Thus, in reducing rotation of the rotating body, the tip of the solenoid pin first comes into pressure contact with the recess to generate a frictional force, and then, the tapered face comes into contact with the projection to generate a counter rotational force. This reduction of a rotational force of the rotating body by means of the frictional force advantageously causes a small impact.

In addition, a tangential component of the generated normal force is used as a counter rotational force in order to control rotation of the rotating body. Thus, the counter rotational force larger than that in the case of control using a frictional force can be obtained. On the other hand, the pin strength against a loss of the solenoid or a wire breakage is divided into components in the pin axis direction and the direction perpendicular to the axis at the tapered face of the solenoid pin, and thus, the impact on the solenoid pin can be reduced. That is, contact of the tapered face with the projection enables the tangential component of the normal force at a contact point to act as a counter rotational force, and both a counter rotational force and an impact strength requirement can be satisfied.

In the aspect, the corner of the projection is preferably rounded.

In this configuration, the corner of the projection and the tapered face can be protected. If the corner of the projection were not rounded, the solenoid pin would be flipped up when the solenoid pin overrides the projection, and thus, the solenoid pin would be in contact with the projection in a shorter period. The shorter contact period would reduce the application time of the frictional force, and thereby, degrade control of rotation of the rotating body. On the other hand, in the configuration of this aspect, since the corner of the projection is rounded, such flip-up of the solenoid pin can be reduced, thereby extending the duration of application of a friction. As a result, rotation of the rotating body can be controlled in a shorter period.

In the aspect, the tip of the tapered face is preferably rounded.

In this configuration, the corner of the projection and the tapered face can be protected. In controlling rotation of the rotating body, the tip of the solenoid pin can be brought into pressure contact with the recess more smoothly.

In the aspect, a gradient of the projection is preferably steeper than a gradient of the tapered face.

In this configuration, the tapered face and the projection are in contact with each other without fail. Thus, the tangential component of the normal force at a contact point can act as a counter rotational force.

In this aspect, the recess preferably has a sliding surface along which the tip of the solenoid pin slides with friction.

In this configuration, in controlling rotation of the rotating body, the tip of the solenoid pin is in pressure contact with the recess, and thereby, generates a frictional force.

The technique of the present application provides a lock device that has a smaller impact in reducing rotation of a rotating body, and thus, not likely to break, and has a high holding power of a steering position of rear wheels.

BRIEF DESCRIPTION OF THE DRAWINGS

The advantages of the disclosure will become apparent in the following description taken in conjunction with the following drawings.

DETAILED DESCRIPTION

Figure 1:
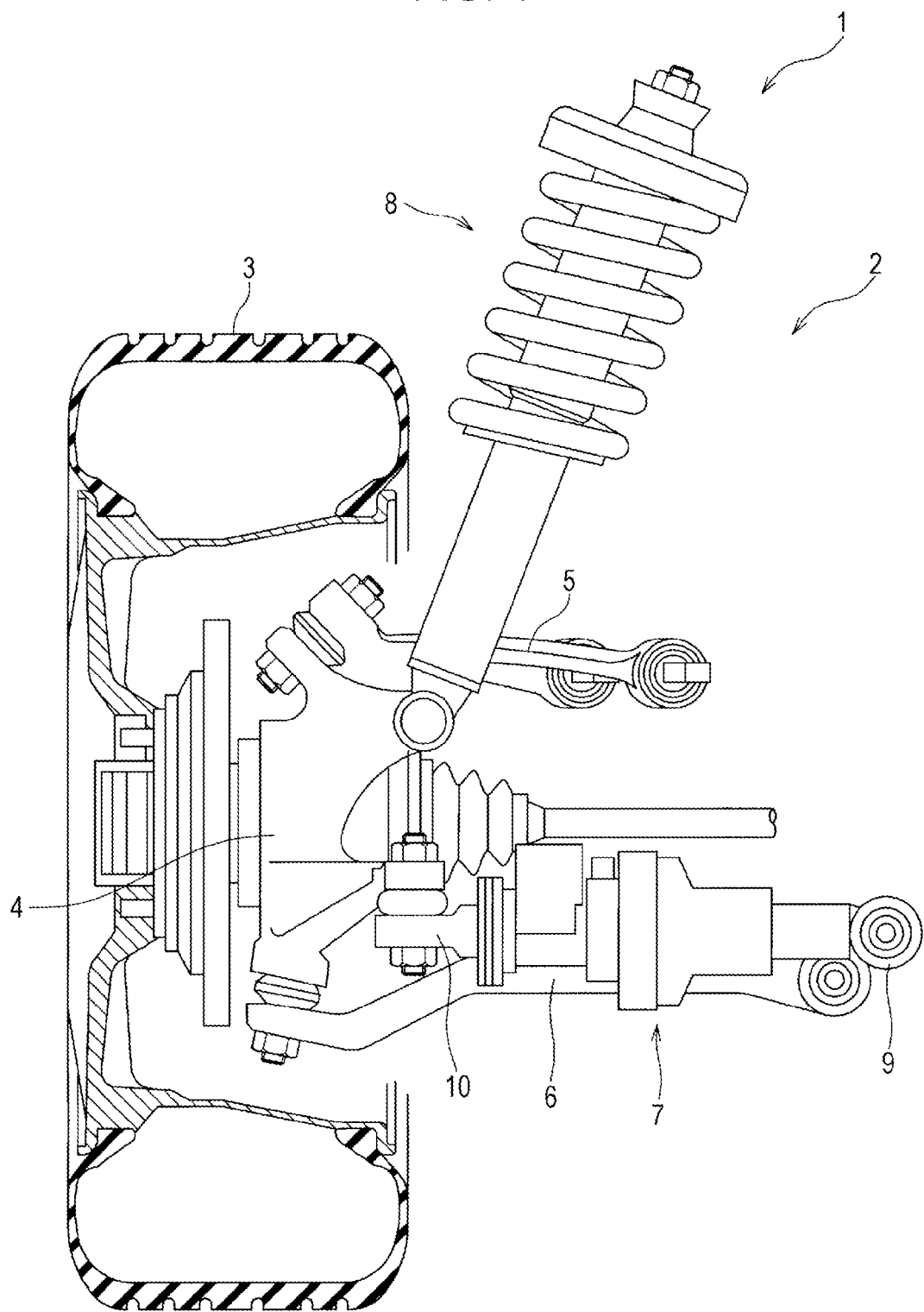
FIG. 1 is a sectional view illustrating part of a vehicle equipped with an actuator including a lock device of an embodiment of the present application.

An embodiment of the present application will be described in detail with reference to the drawings. In the drawings, like reference characters are used to designate identical or equivalent elements, and explanation thereof is not repeated. FIG. 1 is a longitudinal sectional view illustrating a rear suspension 2 and corresponding peripheral parts. The rear suspension 2 is part of a vehicle (a four-wheel steering vehicle) 1 equipped with an actuator (a rear toe control (RTC) mechanism) 7 including a lock device of the present application.

As illustrated in FIG. 1, the rear suspension 2 includes: a knuckle 4 supporting a rear wheel 3 such that the rear wheel 3 can rotate; upper and lower arms 5 and 6 coupling the knuckle 4 to a vehicle body such that the knuckle 4 can move vertically; an actuator 7 that controls (adjusts and changes) wheel alignment, e.g., a toe angle or a camber angle, of the rear wheel 3; and a damper 8 that reduces vertical movement of the rear wheel 3. The base of the actuator 7 is coupled to the vehicle body through a rubber bush joint 9, and the tip of the actuator 7 is coupled to a rear portion (or a lower rear portion) of the knuckle 4 through a rubber bush joint 10.

When the actuator 7 is driven to extend, the rear portion (or the lower rear portion) of the knuckle 4 is pushed outward in the vehicle width direction, and the toe angle of the rear wheel 3 changes in the toe-in direction (i.e., the camber angle decreases). On the other hand, when the actuator 7 is driven to contract, the rear portion (or the lower rear portion) of the knuckle 4 is pulled inward in the vehicle width direction, and the toe angle of the rear wheel 3 changes in the toe-out direction (i.e., the camber angle increases). In this manner, the toe angle (and the camber angle) of the rear wheel 3 is controlled in accordance with the vehicle speed and the steering angle of a steering wheel in addition to steering of a front wheel by operation of the steering wheel, and thereby, straight-running stability and steering performance of the vehicle 1 can be enhanced.

Figure 2:
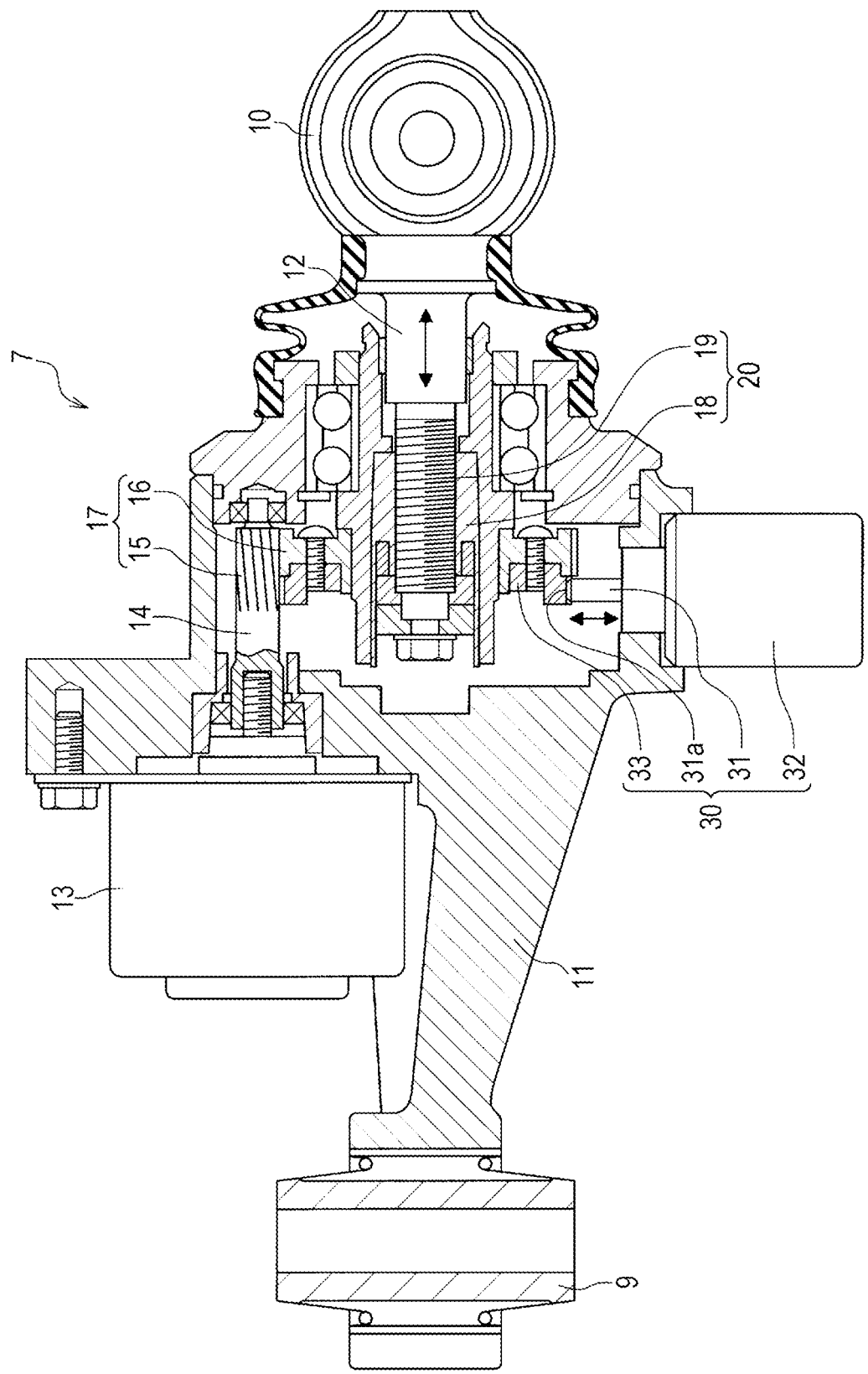
FIG. 2 is a longitudinal sectional view illustrating the actuator including the lock device of the embodiment.

FIG. 2 is a longitudinal sectional view illustrating the actuator 7 including a lock device 30 according to an embodiment of the present application. The actuator 7 includes: a housing 11 integrated with the rubber bush joint 9 coupled to the vehicle body; and a rod 12 integrated with the rubber bush joint 10 coupled to the knuckle 4. Moving the rod 12 into and out of the housing 11 causes the actuator 7 to expand and contract. The housing 11 is provided with a motor 13 with a brush serving as a drive source, a speed reducer 17, a feed screw mechanism 20, and a lock device 30.

The motor 13 is directly coupled to a rotational shaft 14. The motor 13 enables the rotational shaft 14 to rotate. The rotational shaft 14 is coupled to the speed reducer 17. The speed reducer 17 includes a plurality of (two in the example of FIG. 2) gears 15 and 16. The gear 15 is directly coupled to the rotational shaft 14, and rotates at the same rotational speed as the rotational shaft 14. The gear (the rotating body) 16 has a diameter (a diameter based on teeth tip) larger than that of the gear 15. Specifically, the gear (the rotating body) 16 has the largest diameter (tip diameter) among the plurality of gears 15 and 16 constituting the speed reducer 17. The gear 16 is connected to the gear 15, and transmits the rotation movement of the gear 15 to itself, and rotates. The rotational speed of the gear 16 is lower than that of the gear 15. In this manner, the speed reducer 17 reduces the rotational speed input from the gear 15 (the rotational shaft 14), and outputs the reduced speed from the gear 16.

The speed reducer 17 is connected to the feed screw mechanism 20. The feed screw mechanism 20 includes a rotating part 18 and a linearly moving part 19. The rotating part 18 and the linearly moving part 19 are threaded, and are screwed together. The rotating part 18 is directly coupled to the gear 16, and rotates at the same rotational speed as the gear 16. On the other hand, the linearly moving part 19 is restricted so as not to rotate with other components. In this manner, when the rotating part 18 rotates, the linearly moving part 19 linearly moves in accordance with the rotation of the rotating part 18. The linearly moving part 19 is directly coupled to the rod 12. The rod 12 linearly moves in accordance with the linear movement of the linearly moving part 19. This linear movement causes the rod 12 to be moved into and out of the housing 11, and accordingly, the actuator 7 expands and contracts.

The lock device 30 is disposed near the gear (the rotating body) 16. The lock device 30 includes: a solenoid pin 31 having a tapered face 31a at its tip; an actuator (a solenoid) 32 for causing the solenoid pin 31 to move linearly; and a receiver 33 serving as a component dedicated to reception of the solenoid pin 31 that reduces rotation of the gear (the rotating body) 16.

Figure 3:
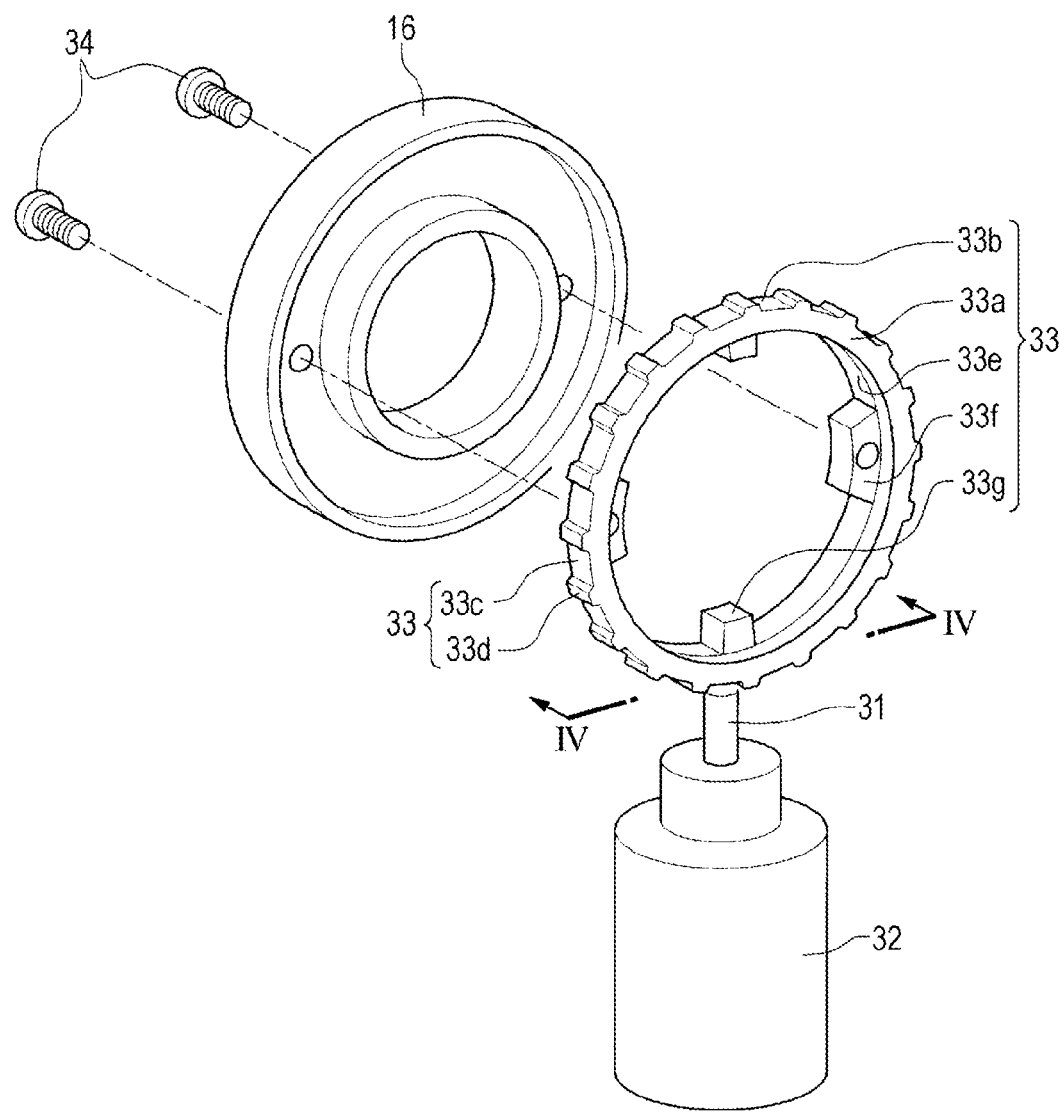
FIG. 3 is a perspective view illustrating a configuration of the lock device of the embodiment.
Figure 4:
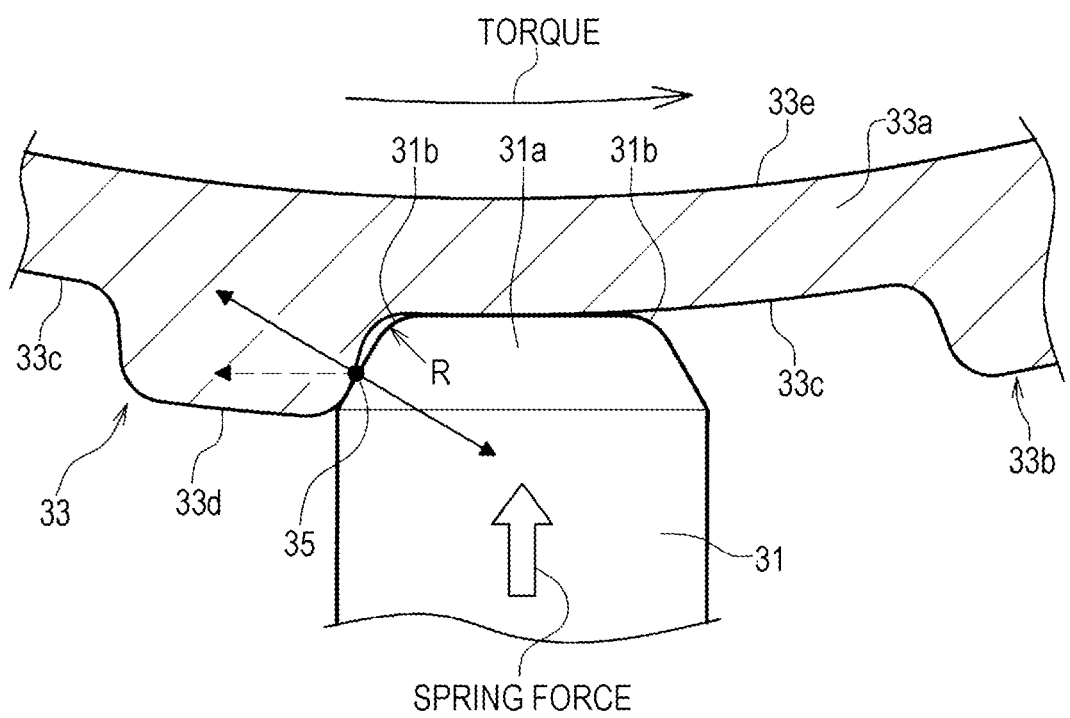
FIG. 4 is a sectional view taken along line IV-IV in FIG. 3.
Figure 5:
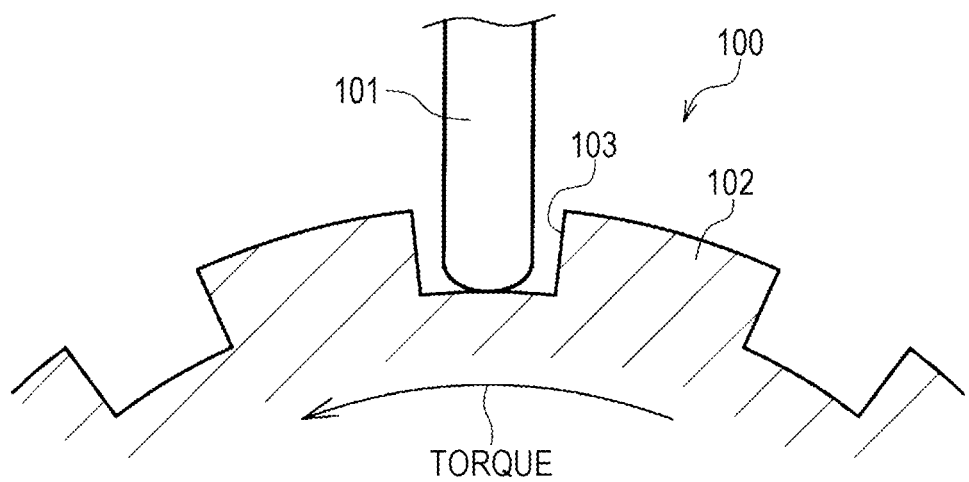
FIG. 5 schematically illustrates a typical lock mechanism of a pin-insertion type using a solenoid.

FIG. 3 is a perspective view illustrating a configuration of the lock device 30. FIG. 4 is a sectional view taken along line IV-IV in FIG. 3. As illustrated in FIGS. 3 and 4, the receiver 33 includes: a cylindrical body 33a; a groove 33c that is a recess formed in an outer peripheral surface 33b of the cylindrical body 33a; and projections 33d arranged at a predetermined pitch in the groove 33c. The corners of the projections 33d are rounded, i.e., provided with R (see FIG. 4). If it is assumed that the outer peripheral surface 33b is the bottom surface of the groove 33c, it can be expressed that the projections 33d are formed on the outer peripheral surface 33b. On the other hand, if it is assumed that the outer peripheral surface 33b is the upper surfaces of the projections 33d, it can be expressed that the groove 33c is formed in the outer peripheral surface 33b.

The distance between adjacent ones of the projections 33d, i.e., the circumferential length of the groove 33c (the recess), is larger than the pin width of the tip of the solenoid pin 31. Thus, at the start of braking rotation of the gear (the rotating body) 16, after a lapse of time in which the tip of the solenoid pin 31 is in contact with (in pressure contact with) the surface of the groove 33c (the recess) (with a friction being applied), the tapered face 31a of the solenoid pin 31 comes into contact with the corner of the corresponding projection 33d. In this embodiment, four to twenty four, for example, projections 33d are provided in the groove 33c (the recesses) at the outer peripheral surface 33b, so that the distance between the projections 33d is larger than the pin width of the tip of the solenoid pin 31. In other words, the surface of the groove 33c (the recess) is used as a frictional sliding surface, and the surfaces of the projections 33d are also used as frictional sliding surfaces. The period in which a friction is applied can be adjusted by changing the number of projections 33d.

The receiver 33 includes a bolt insertion part 33f and a reinforcing projection 33g on an inner peripheral surface 33e of the cylindrical body 33a. The bolt insertion part 33f is fixed on a side of the gear (the rotating body) 16 with a bolt 34. Teeth of the gear (the rotating body) 16 are not shown. The receiver 33 is fixed to the gear (the rotating body) 16, and rotates together with the gear (the rotating body) 16. When rotation of the gear (the rotating body) 16 is reduced, rotation of the receiver 33 is also reduced.

As illustrated in FIG. 4, the solenoid pin 31 includes the tapered face 31a at the tip thereof. The height of the tapered face 31a (i.e., the height of the tapered face 31a toward the outer peripheral surface 33b of the receiver 33) is determined at least at a level at which the tapered face is in contact with the projection 33d with the tip of the solenoid pin 31 being in contact with the groove 33c (the recess) of the receiver 33. The corner 31b of the tip of the tapered face 31a is rounded, i.e., provided with R.

The tip of the solenoid pin 31 and the tapered face 31a face the outer peripheral surface 33b of the receiver 33. The tip of the solenoid pin 31 is caused to move linearly by the actuator (the solenoid) 32, specifically is caused to move toward the outer peripheral surface 33b of the receiver 33 to be in pressure contact with the groove 33c (the recess) of the outer peripheral surface 33b and the projection 33d or is caused to move in the direction away from the outer peripheral surface 33b. By bringing the tip of the solenoid pin 31 into pressure contact with the groove 33c (the recess) at the outer peripheral surface 33b of the receiver 33 and bringing the tapered face 31a into contact with the corner of the projection 33d, rotation movement of the gear (the rotating body) 16 to which the receiver 33 is fixed can be reduced, thereby reducing expansion and contraction of the actuator 7. When the actuator (the solenoid) 32 is turned on and current flows therein, the tapered face 31a of the solenoid pin 31 is released from the outer peripheral surface 33b of the receiver 33, and the gear (rotating body) 16 is unlocked.

When the actuator (the solenoid) 32 is turned off and current does not flow therein, the tip of the solenoid pin 31 is brought into pressure contact with the groove 33c (the recess) at the outer peripheral surface 33b of the receiver 33, and then, the tapered face 31a is brought into contact with the corner of the projection 33d, thereby locking the gear (rotating body) 16. The actuator (the solenoid) 32 (i.e., the lock device 21) is of a normally locked type.

While an ignition switch of the vehicle is on, current is caused to flow in the actuator (the solenoid) 32 such that a current-on state is kept, the gear (the rotating body) 16 is unlocked, thus enabling wheel alignment of the rear wheel 3 of the vehicle 1 to be adjusted. On the other hand, while the ignition switch is off, no current is caused to flow in the actuator (the solenoid) 32 so that a current-off state is created, the tip of the solenoid pin 31 is brought into pressure contact with the groove 33c (the recess) at the outer peripheral surface 33b of the receiver 33, and then the tapered face 31a is brought into contact with the corner of the projection 33d, thereby locking the gear (the rotating body) 16. In the case of occurrence of an error in the vehicle 1, especially the actuator 7, for example, no current is caused to flow in the actuator (the solenoid) 32, i.e., a current-off state, thereby locking the gear (rotating body) 16. In a case where no current cannot flow in the actuator (the solenoid) 32 due to an error, the gear (rotating body) 16 is locked as fail-safe.

Advantages of the lock device 30 with the foregoing configuration will now be described. As illustrated in FIG. 4, the groove 33c (the recess) is formed at the outer peripheral surface 33b of the receiver 33, and the projections 33d are arranged at a predetermined pitch in the groove 33c (the recess). The distance between adjacent ones of the projections 33d, i.e., the circumferential length of the groove 33c (the recess), is larger than the pin width of the tip of the solenoid pin 31. The height of the tapered face 31a toward the outer peripheral surface 33b of the receiver 33 is at least at a level at which the tapered face 31a is in contact with the projection 33d provided that the tip is in contact with the groove 33c (the recess) of the receiver 33. In addition, the corner 31b of the tip of the tapered face 31a and the corner of the projection 33d are rounded, i.e., provided with R.

With this configuration, at the start of reducing rotation of the gear (the rotating body) 16, the tip of the solenoid pin 31 is first received into the groove 33c (the recess) so as to be in pressure contact with the groove 33c, and then a friction is applied such that a frictional force is applied between the tip of the solenoid pin 31 and the groove 33c. This friction applied state continues for a predetermined time because the distance between the projections 33d is larger than the pin width of the tip of the solenoid pin 31. Then, after a lapse of a predetermined duration of the friction applied state, the tip of the solenoid pin 31 comes into contact with the corner of the projection 33d.

The relative positional relationship between the groove 33c (the recess) and the solenoid pin 31 varies depending on the time when the solenoid pin 31 is inserted into the groove 33c (the recess), and thus, the duration of the friction applied state is not uniform.

As illustrated in FIG. 4, suppose the gear (the rotating body) 16 rotates counterclockwise, the tapered face 31a of the solenoid pin 31 comes into contact with a corner of the projection 33d at the opposite side to the rotational direction after a lapse of the duration of the friction applied state. This contact point serves as an application point 35, and a normal force acts on the corner of the projection 33*d* in the direction normal to the tapered face 31*a* from the application point 35 (see solid arrows in FIG. 4). On the tapered face 31*a* at the application point 35, the taper gradient of the projections 33*d* is steeper than the taper gradient of the tapered face 31*a*, the projections 33*d* and the tapered face 31*a* are in contact with each other without fail. By bringing the tapered face 31*a* into contact with the projections 33*d* at the application point 35, a tangential component (see the broken-line arrow in FIG. 4) of the normal force at the application point 35 can act as a counter rotational force.

Figure 6:
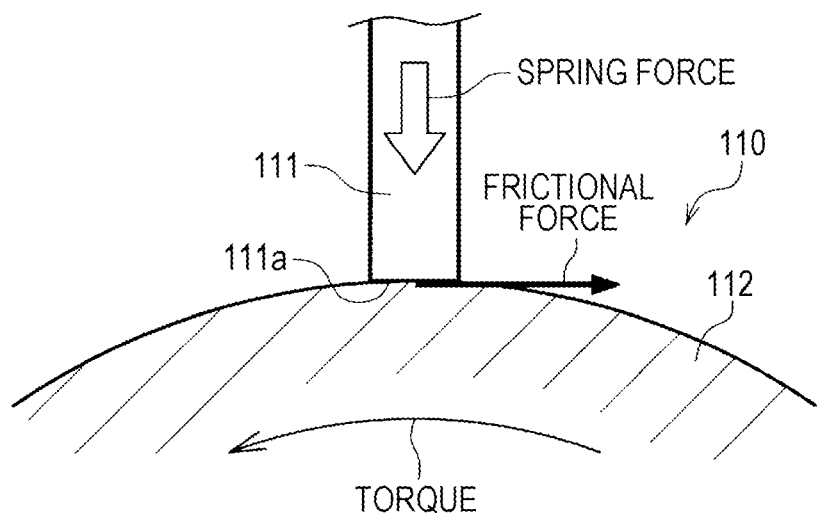
FIG. 6 schematically illustrates a typical lock mechanism of a friction brake type.

In this manner, the tangential component of the generated normal force is used as the counter rotational force so as to control rotation of the gear (the rotating body) 16 through the receiver 33, and thus, a counter rotational force greater than that of a friction brake type illustrated in FIG. 6 can be obtained. On the other hand, the pin strength against a loss of the solenoid or a wire breakage is divided into components in the pin axis direction and the direction perpendicular to the axis at the tapered face 31*a* of the solenoid pin 31, and thus, the impact on the solenoid pin 31 can be reduced.

As illustrated in FIGS. 3 and 4, the receiver 33 includes the cylindrical body 33*a*, the groove 33*c* that is a recess formed at the outer peripheral surface 33*b* of the cylindrical body 33*a*, and the projections 33*d* arranged at a predetermined pitch in the groove 33*c*. The corners of the projections 33*d* are rounded, i.e., provided with R (see FIG. 4). If it is assumed that the outer peripheral surface 33*b* is the bottom surface of the groove 33*c*, it can be expressed that the projections 33*d* are formed on the outer peripheral surface 33*b*. On the other hand, if it is assumed that the outer peripheral surface 33*b* is formed of the upper surfaces of the projections 33*d*, it can be expressed that the groove 33*c* is formed in the outer peripheral surface 33*b*.

The distance between adjacent ones of the projections 33*d*, i.e., the circumferential length of the groove 33*c* (the recess), is larger than the pin width of the tip of the solenoid pin 31. Thus, at the start of reducing rotation of the gear (the rotating body) 16, after a lapse of time in which the tip of the solenoid pin 31 is in contact with (in pressure contact with) the surface of the groove 33*c* (the recess) (with a friction being applied), the tapered face 31*a* of the solenoid pin 31 comes into contact with the corner of the corresponding projection 33*d*. In this embodiment, four to twenty four, for example, projections 33*d* are provided in the groove 33*c* (the recess) at the outer peripheral surface 33*b*, so that the distance between the projections 33*d* is larger than the pin width of the tip of the solenoid pin 31. The period of the friction applied state can be adjusted by changing the number of projections 33*d*.

The receiver 33 includes the bolt insertion part 33*f* and the reinforcing projection 33*g* on the inner peripheral surface 33*e* of the cylindrical body 33*a*. The bolt insertion part 33*f* is fixed at the side of the gear (the rotating body) 16 with the bolt 34. Teeth of the gear (the rotating body) 16 are not shown. The receiver 33 is fixed to the gear (the rotating body) 16, and rotates together with the gear (the rotating body) 16. When rotation of the gear (the rotating body) 16 is reduced, rotation of the receiver 33 is also reduced.

As described above, the lock device 30 includes: the receiver 33 that has the outer peripheral surface 33*b* attached at the side surface of the gear (the rotating body) 16 and configured to rotate together with rotation of the gear (the rotating body) 16 and that receives the solenoid pin 31 at the outer peripheral surface 33*b*; and the solenoid pin 31 whose tip can be in pressure contact with the outer peripheral surface 33*b* of the receiver 33. The receiver 33 includes the groove 33*c* (the recess) that is wider than the tip of the solenoid pin 31 and the projections 33*d* projecting from the groove 33*c* (the recess) at the outer peripheral surface 33*b*. The solenoid pin 31 has the tapered face 31*a* at the tip thereof. The height of the tapered face 31*a* is at least at the level at which the tapered face 31*a* is in contact with the corner of the corresponding projection 33*d* while the tip is in contact with the groove 33*c* (the recess).

With this configuration, in braking rotation of the gear (the rotating body) 16, the tip of the solenoid pin first comes into pressure contact with the groove 33*c* (the recess) to generate a frictional force, and then the tapered face comes into contact with the projection 33*d* to generate a counter rotational force. This reduction of a rotational force of the rotating body by means of the frictional force advantageously causes a small impact. In addition, the tangential component of the generated normal force is used as a counter rotational force in order to control rotation of the gear (the rotating body) 16. Thus, a counter rotational force larger than that in rotational force control using a frictional force can be obtained. On the other hand, for the required pin strength against a loss of the solenoid or a wire breakage, the impact is divided into components in the pin axis direction and the direction perpendicular to the axis at the tapered face 31*a* of the solenoid pin 31, and thus, the impact on the solenoid pin 31 can be reduced. That is, contact of the tapered face 31*a* with the projection 33*d* enables the tangential component of the normal force at the contact point to act as a counter rotational force, and both a counter rotational force and an impact strength requirement can be satisfied.

In this embodiment, the corners of the projections 33*d* are rounded, i.e., provided with R. Thus, the corners of the projections 33*d* and the tapered face 31*a* can be protected. In addition, flip-up of the solenoid pin 31 can be reduced, thereby extending the duration of application of a friction. As a result, rotation of the gear (the rotating body) 16 can be controlled in a shorter period.

Further, in this embodiment, the rounding of the tip of the tapered face 31*a* can protect the corners of the projections 33*d* and the tapered face 31*a*. In controlling rotation of the rotating body, the tip of the solenoid pin can be brought into pressure contact with the groove 33*c* (the recess) more smoothly.

In this embodiment, the gradient of the projections 33*d* is larger than that of the tapered face 31*a*. Thus, the tapered face 31*a* and the projection 33*d* can be in contact with each other without fail. As a result, the tangential component of the normal force at a contact point can act as a counter rotational force.

The lock device 30 of the embodiment has been described in detail with reference to the drawings. However, the present application is not limited to the foregoing embodiment, and the embodiment may be appropriately modified or improved without departing from the scope of the present application. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A lock device configured to be mounted on an actuator that expands and contracts by using a motor and a feed screw mechanism so as to adjust wheel alignment of a rear wheel of a vehicle, the lock device being configured to brake rotation of a rotating body that rotates in accordance with rotation of the motor, the lock device comprising:
- a receiver disposed on a side surface of the rotating body and configured to rotate together with the rotating body, the receiver having an outer peripheral surface located at the side surface of the rotating body, the outer peripheral surface rotating with the rotating body; and
- a solenoid pin including a tip able to be in pressure contact with the outer peripheral surface of the receiver, the solenoid pin being configured to be received at the outer peripheral surface of the receiver, wherein
- the outer peripheral surface of the receiver has a recess wider than the tip of the solenoid pin and a projection projecting from the recess,
- the solenoid pin has a tapered surface at the tip, and
- the tapered surface has a height at least of a level at which the tapered surface is in contact with a corner of the projection with the tip being in contact with the recess.

2. The lock device of claim 1, wherein
the corner of the projection is rounded.

3. The lock device of claim 1, wherein
the tip of the tapered surface is rounded.

4. The lock device of claim 1, wherein
a gradient of the projection is steeper than a gradient of the tapered surface.

5. The lock device of claim 4, wherein
the projection includes a side surface, and a gradient of the side surface is steeper than a gradient of the tapered surface.

6. The lock device of claim 1, wherein
the recess has a sliding surface along which the tip of the solenoid pin slides with friction.

7. The lock device of claim 6, wherein
the sliding surface is a bottom surface of the recess.

8. The lock device of claim 1, wherein
the tip of the solenoid pin has a tapered shape and the tapered surface is a side surface of the solenoid pin.

9. The lock device of claim 1, wherein
the solenoid pin moves linearly toward and away from the outer peripheral surface of the receiver, and
the recess of the outer peripheral surface receives the tip of the solenoid pin.

10. The lock device of claim 1, wherein
the outer peripheral surface of the receiver includes a pair of the projection, and the recess is disposed between the pair of the projection.

* * * * *